United States Patent
Heskett et al.

[15] 3,685,659
[45] Aug. 22, 1972

[54] FILTER ASSEMBLY HAVING REMOVABLE FILTER ELEMENT

[72] Inventors: Don Edward Heskett, Villa Park; Frank Kryder Hoover, Evanston, both of Ill.; Robert Burkhalter, Jr., Fort Atkinson, Wis.; Douglas West Anderson, Palatine, Ill.

[73] Assignee: Morton International, Inc., Chicago, Ill.

[22] Filed: Nov. 24, 1969

[21] Appl. No.: 879,376

[52] U.S. Cl. ............................................. 210/444
[51] Int. Cl. ........................................... B01d 29/00
[58] Field of Search ...... 210/435, 436, 440, 443, 444, 210/240

[56] References Cited

UNITED STATES PATENTS

| | | | |
|---|---|---|---|
| 1,642,864 | 9/1927 | Williams | 210/440 |
| 1,989,795 | 2/1935 | Fellows | 210/440 |
| 3,289,847 | 12/1966 | Rothemund | 210/440 X |
| 2,333,890 | 11/1943 | Russell | 210/440 |
| 2,413,769 | 1/1947 | Kasten | 210/240 |

OTHER PUBLICATIONS

Auslegeschrift 1189520, Beck et al. March 25, 1965 (Germany)

*Primary Examiner*—Reuben Friedman
*Assistant Examiner*—T. A. Granger
*Attorney*—Pendleton, Neuman, Williams & Anderson

[57] ABSTRACT

This disclosure relates to water filtering apparatus, employing a replaceable filter element, supported in an assembly having a removable bowl. A deformable seal is provided between the stationary part of the assembly and the bowl, and the upper portion of the bowl extends above the seal to receive water drained from the stationary part during removal and replacement of the filter element. A valve, operative to pass a slight flow of fluid to the exterior of the unit when the bowl is not properly assembled with the stationary part, closed when the apparatus is correctly assembled, indicates proper assembly of the parts.

18 Claims, 8 Drawing Figures

3,685,659
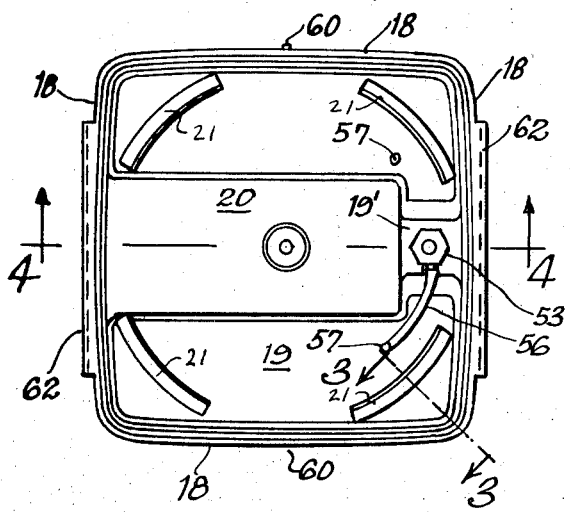
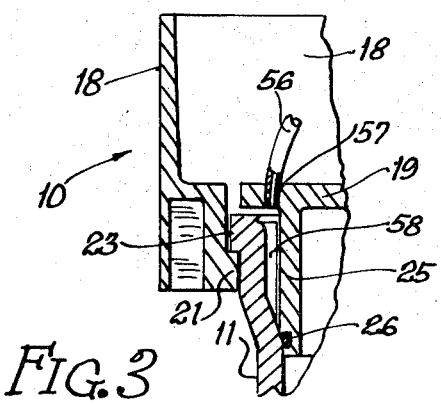
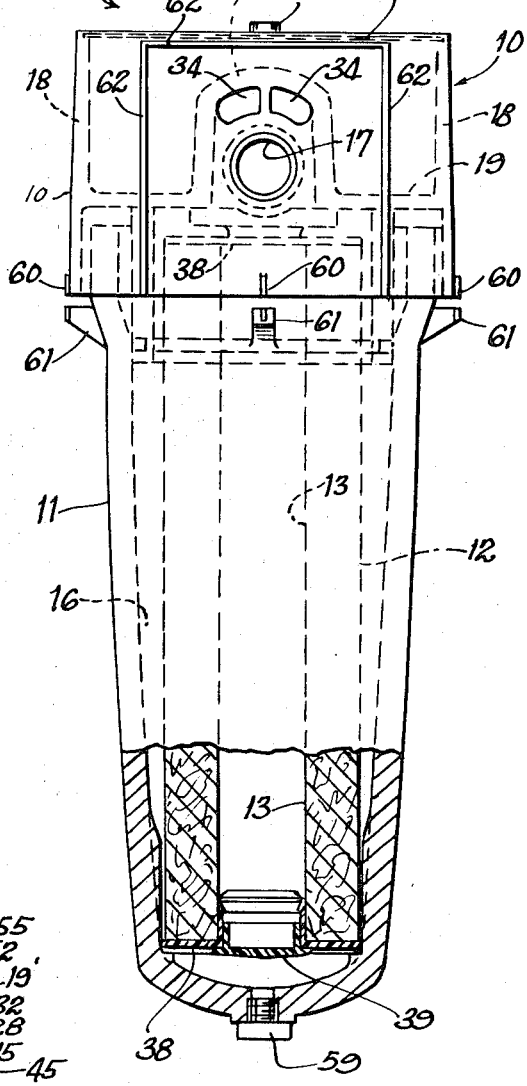
INVENTORS
Don Edward Heskett
Frank Kryder Hoover
Robert Burkhalter, Jr.
Douglas West Anderson
by Pendleton, Neuman, Seibold
and Williams Attys

FILTER ASSEMBLY HAVING REMOVABLE FILTER ELEMENT

BACKGROUND OF THE INVENTION

In many localities the available tap water has a distinct taste and odor, and sometimes even a discernible color, due to chlorine and/or other chemical or mineral substances carried in the water. These characteristics are objectionable, particularly when the water is used for drinking or for preparing foods and beverages, where the taste and odor of the water may be imparted to the food or drink. It is therefore desirable that the water be treated in such a way as to remove the objectionable taste, odor and color from the water before the same is used for drinking or for the preparation of foods and beverages.

In water filtering apparatus heretofore known, the disassembly and reassembly of the apparatus in the course of replacing a filter element has been a cumbersome and difficult task. This is partly due to the use of sealing arrangements having compressive gaskets which require relatively great forces to be exerted between the removable and stationary parts of the filter apparatus in order to assemble and disassemble these components. It is also partly due to the use of threaded connections between the stationary and removable parts.

Moreover, it has been difficult to determine when the movable and stationary parts are correctly positioned with respect to each other. Incorrect positioning, as a result of only partial assembly of the parts, tends to promote leakage and premature failure of the apparatus. It is therefore desirable to have some kind of indicator to show when the parts are in the correctly assembled relationship.

Another disadvantage of some prior art units is a tendency to discharge relatively great amounts of water during disassembly of the apparatus and replacement of the filter element. It is therefore desirable to provide an arrangement which permits the apparatus to be disassembled, for replacement of the filter element, without any accompanying discharge or dripping, which is inconvenient to the user.

SUMMARY OF THE INVENTION

Accordingly, it is the principal object of the invention to provide a filter assembly in which the removable and stationary parts of the assembly may be easily assembled and disassembled during replacement of the filter element.

Another object of the present invention is to provide a mechanism for indicating when the proper relationship between the stationary and removable parts has been achieved during reassembly of the apparatus.

These and other objects of the present invention will be manifest upon an examination of the following description and the accompanying drawings.

In accordance with one embodiment of the present invention there is provided a filter assembly comprising a stationary part having inlet and outlet ports, a bowl for supporting a replaceable filter element, and removably connected with the stationary part, connecting means for connecting a filter element between the inlet and outlet ports, sealing means interconnected between the stationary part and the bowl, the sealing means presenting a variable frictional force between the stationary part and the bowl in accordance with the pressure differential across the seal of the sealing means, and a manually operable valve for selectively relieving the pressure across the seal.

DESCRIPTION

Reference will now be made to the accompanying drawings, in which:

FIG. 1 is a vertical cross sectional view of the assembly with the removable filter element in place;

FIG. 2 is a top view of the stationary part of the assembly illustrated in FIG. 1;

FIG. 3 is a partial vertical cross sectional view of the apparatus, taken along the section lines 3—3 in FIG. 2;

FIG. 4 is a vertical cross section of the apparatus, taken along the section line 4—4 in FIG. 2;

Figure 5:
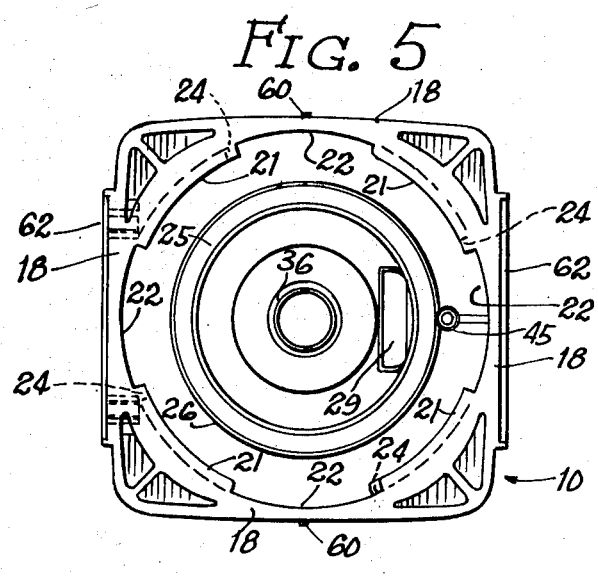
FIG. 5 is a bottom view of the stationary part, with the bowl removed.

Referring now to FIG. 1, the filter assembly 9 has a stationary part 10 and a removable bowl 11, the latter supporting a replaceable filter element or cartridge 12. The filter element 12 is formed in the shape of a circular cylinder having a central coaxial bore 13, and is adapted to filter water by having it pass through the element from the exterior thereof into the bore 13. The inlet port 15 (FIG. 4) of the assembly is connected to the space 16 within the bowl 11 and exterior to the filter element 12, and the interior bore 13 of the filter element is connected to the outlet port 17 of the assembly, by connections which will be described.

The stationary part 10 is adapted to be rigidly connected to a supply pipe and an outlet pipe (not shown) so that the entire filter assembly is supported and held rigid by the pipes connected to it. The supply and outlet pipes may be either connected directly to the inlet and outlet ports 15 and 17, or connected to them through a valve arrangement having a stop valve and/or a bypass valve.

The stationary part 10 is preferably molded in one integral unit and is composed of a suitable plastic material. The bowl 11 is also preferably formed of molded plastic. The stationary part 10 incorporates side walls 18, arranged in the form of a continuous hollow structure having a generally rectangular cross section, with rounded corners. A horizontal wall 19 interconnects the side walls 18 about midway up the side walls 18. The horizontal wall 19 has a centrally located raised portion 20, which incorporates various fluid passageways, which will be described.

Four L-shaped flanges 21 (FIGS. 3 and 5) depend from the wall 19, and are adapted to support the bowl 11. The flanges 21 projects inwardly toward the bowl 11. Separating and interposed between each adjacent pair of flanges 21 is a space 22. The upper portion of the removable bowl element (FIG. 6) is provided with four lugs 23, which are adapted to fit into the spaces 22 until the lugs 23 reach an elevation above the flanges 21. Thereafter the bowl 11 is rotated in a clockwise direction (as viewed in FIG. 5) until each lug 23 is above a flange 21, as shown in FIG. 3. Further clockwise movement is stopped by abutments 24 located above each of the flanges 21 at the extreme clockwise end thereof (as viewed in FIG. 5). The abutments 24 also are attached to and depend from the walls 18 and 19.

Figure 8:
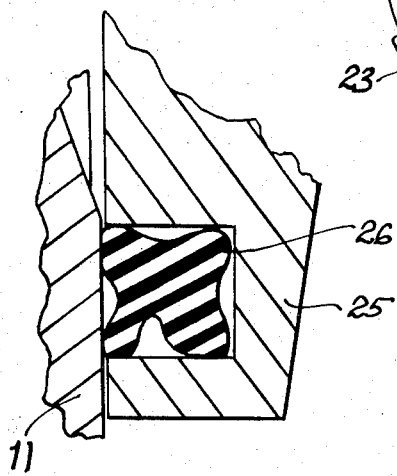
FIG. 8 is an enlarged, partial vertical cross section of the apparatus, showing the seal between the stationary part and the removable bowl.

Centrally located within the stationary part 10, and depending from the wall 19, is a tubular projection 25 (FIGS. 3 and 4). The tube 25 is circular in cross section and is sized so that its lower portion it narrowly fits within the upper portion of the bowl 11. A seal 26 is disposed in an annular groove on the outside surface of the tube 25, near its lower extremity, and operates to create a fluid seal between the tube 25 and the bowl 11. The seal 26, shown in enlarged cross-sectional view in FIG. 8, is of the cup variety, so that there is substantially no force impeding movement between the removable bowl element 11 and the tube 25 when the bowl 11 is assembled with the stationary part 10. When the pressure of the fluid within the removable bowl 11 increases, however, the cup seal 26 deforms to the position shown in FIG. 8, and is forced against the interior wall of the bowl 11 by the pressure differential across the seal. The cup seal is adequate to prevent leaking at high pressure differentials, but does not demand an undue amount of force in disassembling the parts of the assembly, as long as the pressure differential across the seal is low. As more fully explained hereinafter, the low pressure condition is met during replacement of the filter element 12 by the operation of a relief valve, which reduces the pressure differential across the seal when the filter element is being replaced.

A suitable seal is the "Quad Kup" seal, marketed by the Minnesota Rubber Company.

Referring now to FIG. 4, the arrangements for conveying water into the interior of the bowl 11, and from the central bore 13 of the filter element 12 to the outlet port 17, are illustrated. A bore 27 leads from the inlet port 15 to a chamber 28 molded within the raised portion 20 of the stationary part 10. An aperture 29 leads from the chamber 28 through the wall 19 of the stationary part 10 and communicates with the space 16 between the filter element 12 and the bowl 11. A bore 30, coaxial with the inlet port 15, communicates with a passageway 31 leading to the outlet port 17. The bore 30 is plugged with a rubber plug 32 having a flange supporting the plug in position against the force of the water flowing through the inlet port 15. A passageway 33 also formed within the raised portion 20, leads from the chamber 28 to a pair of ports 34 located just above the outlet port 17. The passageway 33 is normally blocked with a rubber plug 35. The plugs 32 and 35 are removed under certain conditions, which conditions are described hereinafter.

A second tube 36, coaxial with the tube 25, and centrally located within it, projects downwardly from the wall 19 and communicates with the interior bore 13 of the filter element 12. A seal 37, molded as part of an end cap 38 secured to the upper end of the filter element 12, is provided to form a seal between the tube 36 and the bore 13 within the filter element 12. A similar end cap 38 is provided at the lower end of the filter element 12, and the lower end of the bore 13 is closed with a closure cap 39 (FIG. 1). The only flow path available for the water is from the space 16, through the filter element 12, into the interior bore 13, and thence out through the tube 36, the passageway 31 and the outlet port 17. The seal 37 comprises a deformable conical shaped member extending from the interior end of the tube 40, integral with the end cap 38, toward the interior of the tube 40. Pressure across the seal forces it into tight sealing relation with the tube 36. Very little force is exerted between the seal 37 and the tube 36, however, as long as there is no pressure differential across the seal 37.

Figure 6:
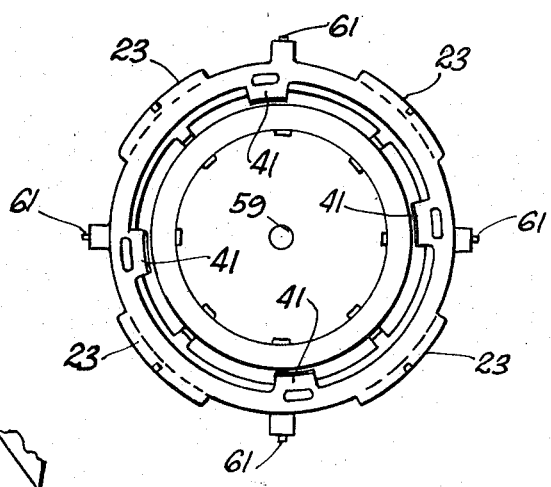
FIG. 6 is a plan view of the removable bowl.
Figure 7:
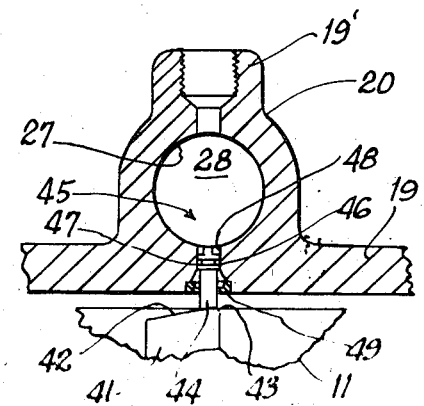
FIG. 7 is a partial vertical cross section of the apparatus, taken along the section line 7—7 in FIG. 4.

Referring now to FIGS. 4, 6 and 7, the mechanism for indicating whether the parts are in the correct alignment after the bowl 11 has been assembled together with the stationary part 10 is shown. Four identical cams 41 are molded on the interior side of the upper portion of the bowl 11, and placed symmetrically around the periphery of the bowl 11. Each cam 41 has a ramp surface 42 and a flat upper surface 43. One of the cams 41 cooperates with a valve steam 44, forcing it upwardly and closing a valve 45. The valve stem 44 is equipped with an O-ring 46, held in position in an annular groove 47, which is provided in the valve stem 44. The O-ring 46 cooperates with a bore 48 in the stationary part 10, to close the bore 48 against downward passage of water from the inlet port 15 when the valve 45 is in its upper (closed) position. The upper position is assumed when the bowl 11 is in correctly assembled condition, relative to the stationary part 10, viz., the bowl 11 having a rotated sufficiently to bring the flat portion 43 of the cam 41 into juxtaposition with the valve stem 44.

When the bowl 11 is not in its proper closed position, the stem 44 is free to move downwardly in response to the force of the water pressure in the chamber 28, until stopped by the ramp surface 42 or a retainer member 49 secured to the stationary part 10, within the bore 48. The retainer member 49 does not form a seal with the valve stem 44 or with the O-ring 46, and therefore water is free to flow from the port 15 and the chamber 28 downwardly through the bore 48, into the space above the upper extremity of the bowl 11, as illustrated in FIG. 4. From there, the water flows through the space 50 separating the upper extremity of the bowl 11 from the stationary part 10. This water then runs downwardly partly into the bowl 11 and partly along the outside of the bowl 11 to the floor below the assembly 9. Such leaking indicates to the operator assembling the unit that the bowl 11 is not in its correct position with relationship to the stationary part 10, and also that there is water entering the assembly at the inlet port 15. This leaking is prevented during disassembly of the bowl element 11 for the purpose of replacing a filter element 12, by a mechanism which is described hereinafter.

As described above, the seal 26 (FIGS. 4 and 8) between the bowl 11 and the downwardly extending tube 25 exerts a force dependent upon the pressure differential across the seal. Therefore it is necessary to relieve the pressure across this seal, in order to facilitate disassembly of the elements. For that purpose a vent valve 51 (FIG. 4) is provided, which valve communicates with the interior of the chamber 28. The valve 51 employs a hollow tube 52 secured on the wall 19 directly above the chamber 28. Its actuating member is a thumb screw 53, extending upwardly from the tube 52 and adapted to be manually grasped at a position above the upper wall 54 adhesively secured to the upper end of the stationary part 10. When the screw 53 is rotated in a counterclockwise direction, as viewed from above, a passageway is opened from the interior of the tube 52 to a port 55, which interconnects with a tube 56 (FIGS. 2 and 3). The tube 56 is a length of flexible tubing connected at one end to the port 55, and at the other end to one of two apertures 57, disposed in the wall 19. The two apertures 57 are located above a space 58 (FIG. 3), provided between the tube 25 and the upper extremity of the bowl 11.

The valve 51 (FIG. 4) is opened after the apparatus is isolated by closing stop valves or the like in the pipes connected with the inlet port 15 and the exit port 17. When the valve 51 is opened, a passageway exists from the inlet port 15 and the chamber 28 connected thereto to the space 58 above the seal 26. As this space is normally dry, being open to the atmosphere via the space 50, the water flowing through the tube 56 and the aperture 57 easily displaces the air and is contained in the space 58. The space 58 is more than adequate to collect all of the water displaced by the relaxation of the plastic stationary part 10 and the plastic bowl 11 on depressurization which flows through the valve 51, so that depressurizing causes no leakage to the floor below the assembly 9 as a result of opening the vent valve 51. After the pressure has been relieved, the seal 26 relaxes, to facilitate disconnection and removal of the bowl 11 to replace the filter element 12.

When the bowl 11 is removed, the water within the stationary part 10 drains into the upper portion of the bowl 11, through the tube 36 and through the aperture 29. The bowl 11 is held directly below such aperture and tube during removal so that all of the water flowing therethrough is collected in the upper part of the bowl 11. The bowl 11 is rotated prior to removal, to bring the lugs 23 into alignment with the spaces 22. In the course of this, the cam 41 is rotated out of position beneath the aperture 49. After pressure is relieved through the valve 51, there is generally not sufficient pressure drop across valve 45 to cause it to open since the O-ring 46 tends to hold it in place. The upper extremity of the bowl 11 extends far enough above the seal 26 to provide an adequate volume for collection of this quantity of water, in addition to the water relieved through the vent valve 51, as described above.

If, in the installation of the assembly 9, the stop valves in the inlet and outlet pipes must be placed at some distance from the filter housing, there may not be enough capacity in the space 58 to accommodate the amount of water which must be drained. In this event, a plug 59, threadably mounted in the bottom of the bowl 11, is removed to provide drainage prior to removing the bowl 11.

Correct assembly of the bowl 11 and the fixed part 10 is also indicated by alignment of an index mark 60, located on the exterior of the stationary part 10, with a corresponding index mark on a flange 61 of the bowl 11. Four of the flanges 61 are provided near the top of the bowl 11, and extending outwardly from the bowl. They are provided to indicate when the bowl has been properly installed relative to the stationary part 10. When the top of flange 61 is directly below index-mark 60 (FIG. 1) the retaining flanges 21 and 23 are fully engaged.

The present invention is preferably used in conjunction with an installation for filtering cold water, and may be mounted under a kitchen sink or the like. However, it is also contemplated that fluids other than water may be filtered, and the apparatus may also be employed with hot water.

The filter element 12 may be employed for treating the water as well as for filtering. Any of a variety of filter materials may be employed, but preferably the filter material is a porous body of closely spaced fluid treating aggregate particles bound together by a polymeric matrix. A suitable material is disclosed and claimed in the copending application of Donald E. Heskett et al., Ser. No. 581,507, filed Sept. 23, 1966 now U.S. Pat. No. 3,538,020. The porous body may contain filtering and/or treating material, such as activated charcoal, or the like.

As described above, the bore 30 and the passageway 33 are both plugged with the plugs 32 and 35, respectively. The assembly 9 is, however, adapted for use under circumstances in which the plug 35 is removed, and another sealing plug (not shown) is threaded into the inlet port 15. The ports 34, connecting with the passageway 33, then becomes the inlet ports, and water flows through the passageway 33 into the inlet chamber 28. This arrangement puts the inlet and outlet ports on the same side of the stationary part 10, where they may conveniently be connected with another unit (not shown) containing stop valves and/or a bypass valve, by which water is bypassed around the filter assembly 9. The other unit is preferably mounted to the fixed part 10 by means of a bolt passing through the bore 30, with the head of the bolt replacing the plug 32. When so mounted, the other unit may be rotated to any position, about the axis of the bore 30, without affecting alignment of the outlet port 17, for it is coaxial with the bore 30. Provision may also be made for the inlet ports 34, by providing a mating port having an annular groove concentric with the outlet port 17. A U-shaped rib 62 (FIG. 1) is provided on one of the side walls 18 to receive the face of the other unit, and prevent rotation of the same, relative to the assembly 9, after tightening the bolt connecting the unit to the assembly 9.

What is claimed is:

1. A filter assembly comprising a stationary part having fluid inlet and outlet ports, a bowl for supporting a replaceable filter element removably connected with said stationary part, connecting means for connecting said filter element between said inlet and outlet ports, a pressure deformable cup seal located between said stationary part and said bowl, said cup seal being constructed and arranged to deform in proportion to the difference between the fluid pressure at said inlet port and the fluid pressure at said outlet port to provide a variable force between said stationary part and said bowl in proportion to the difference between the fluid pressure at said inlet port and the fluid pressure at said outlet port, said variable force being substantially eliminated when there is substantially no difference between the fluid pressure at said inlet port and at said outlet port, and a manually operable relief valve connected to said inlet port for selectively reducing the force between said stationary part and said bowl by selectively releasing the pressure at said inlet port.

2. Apparatus according to claim 1, including a tubular projection depending downwardly from said stationary part, an annular groove disposed on the exterior surface of said tubular projection, said sealing means comprising an annular cup seal disposed in said groove, and said bowl having a curved surface surrounding said tubular projection and contacting said cup seal.

3. Apparatus according to claim 2, including a plurality of flanges secured to said stationary part and projecting inwardly toward a vertical axis, said bowl comprising an upwardly opening hollow body of revolution, symetrical about said axis, a plurality of lugs connected to the upper portion of said bowl and projecting radially outwardly from said axis, said flanges being spaced apart to permit said lugs to pass upwardly between adjacent ones of said flanges, and an open space about each of said flanges to permit each of said lugs to be moved to a position above one of said flanges, whereby said flanges and lugs connect said bowl with said stationary part.

4. Apparatus according to claim 2, wherein said filter element comprises an upwardly opening hollow circular cylinder, said filter element being supported in said bowl coaxially with said tubular projection, a side of said filter element spaced from a side of said bowl, and including a second tubular projection, coaxial with the first tubular projection and located within said first tubular projection, said second tubular projection extending into said hollow filter element, and second sealing means interconnected between said second tubular projection and said filter element, whereby fluid flowing through said first tubular projection into said bowl, and out of said bowl through said second tubular projection is filtered through said filter element.

5. Apparatus according to claim 4 wherein said second sealing means presents a variable force between said second tubular projection and said filter element in accordance with the pressure differential across the seal of said second sealing means.

6. Apparatus according to claim 4, including a chamber within said stationary part connected to said inlet port, a passageway connecting said chamber with the space between said filter element and said bowl, within said first tubular projection, and means connecting said outlet port with the interior of said second tubular projection.

7. Apparatus according to claim 1, wherein said relief valve is interconnected between one side of said sealing means and the other side of said sealing means, whereby the pressure differential across said sealing means may be dissipated by said relief valve prior to removal of said bowl from said stationary part.

8. Apparatus according to claim 7, including a stop valve connected between a water supply pipe and said inlet port for cutting off said water supply prior to opening said relief valve.

9 Apparatus according to claim 7, wherein said relief valve has a manually operable control member extending outwardly from said valve to the exterior of said assembly.

10. Apparatus according to claim 7, including means for connecting the inlet of said valve with said inlet port and the outlet of said valve with a location maintained at atmospheric pressure.

11. Apparatus according to claim 10, wherein said bowl comprises an upwardly opening body having an upper portion extending upwardly beyond said sealing means to define a chamber between said bowl and said stationary part, said upper portion of said bowl being spaced from said stationary member to provide an opening leading from said chamber to the exterior of the assembly, the outlet of said valve being connected to a location directly above said chamber.

12. In a filter assembly having a stationary part with inlet and outlet ports, a bowl for supporting a replaceable filter element, and connecting means for connecting said filter element between said inlet and outlet ports, the combination comprising coupling means for removably coupling said bowl with said stationary part, said coupling means including a flange secured to said stationary part and a corresponding lug secured to said bowl, said bowl adapted to be rotated relative to said stationary part to bring said lug into a position above said flange, and indicator means for indicating when said bowl is in properly assembled relation with said stationary part, said indicator means comprising a valve having its inlet connected to a supply of water within said assembly and its outlet connected to a location on the exterior of said assembly, and means responsive to the relative position between said bowl and said stationary part for selectively allowing said valve to open.

13. Apparatus according to claim 12, including a cam secured to said bowl, and a cam follower secured to said stationary member, said cam follower being operable to allow said valve to open except when said cam is in a predetermined relation with said cam follower.

14. Apparatus according to claim 13, wherein said bowl comprises an upwardly opening hollow body and said valve comprises an aperture connecting said inlet port with a location on the exterior of said assembly directly above the inside of the upper rim of said bowl, a valve stem mounted in said aperture, said valve stem having a sealing member adapted to seal said aperture when said valve stem is moved toward the inlet port side of said aperture, and a cam secured to the upper portion of the inside of said rim to engage and move said stem upwardly when said bowl is in properly assembled relation with said stationary part.

15. Apparatus according to claim 14, including sealing means interconnected between said stationary part and said bowl, said bowl having a curved surface surrounding said sealing means and contacting said sealing means at a location spaced below the upper rim of said bowl, the upper part of said bowl being spaced from said stationary part to define a chamber, said upper rim being spaced from said stationary part to provide an opening leading from said chamber to the exterior of said assembly.

16. In a filter assembly having a stationary part with inlet and outlet ports, a bowl for supporting a replaceable filter element removably connected with said stationary part, connecting means for connecting said filter element between said inlet and outlet ports, the combination comprising a downwardly opening tubular projection secured to said stationary part, said bowl comprising an upwardly opening hollow body surrounding the lower end of said tubular projection, and sealing means interconnected between said tubular projection and said bowl, said bowl having a portion extending upwardly from said sealing means and away from said tubular projection to define a chamber within said bowl and without said tubular projection, whereby water flowing downwardly through said tubular projection is received in said chamber when said bowl is removed downwardly from said stationary part.

17. In a filter assembly having a stationary part with inlet and outlet ports, a bowl for supporting a replaceable filter element removably connected with said stationary part, connecting means for connecting said filter element between said inlet and outlet ports, the combination comprising a downwardly opening tubular projection secured to said stationary part, said bowl comprising an upwardly opening hollow body surrounding the lower end of said tubular projection, and sealing means interconnected between said tubular projection and said bowl, said bowl having a portion extending upwardly from said sealing means and away from said tubular projection to define a chamber within said bowl and without said tubular projection, whereby water flowing downwardly through said tubular projection is received in said chamber when said bowl is removed downwardly from said stationary part, the upper rim of said bowl being spaced from said stationary part to provide an opening leading from said chamber to the exterior of said assembly.

18. In a filter assembly having a stationary part with inlet and outlet ports, a bowl for supporting a replaceable filter element removably connected with said stationary part, connecting means for connecting said filter element between said inlet and outlet ports, the combination comprising a downwardly opening tubular projection secured to said stationary part, said bowl comprising an upwardly opening hollow body surrounding the lower end of said tubular projection, and sealing means interconnected between said tubular projection and said bowl, said bowl having a portion extending upwardly from said sealing means and away from said tubular projection to define a chamber within said bowl and without said tubular projection, whereby water flowing downwardly through said tubular projection is received in said chamber when said bowl is removed downwardly from said stationary part, the exterior surface of said tubular projection including an annular groove disposed therein, said sealing means comprising an annular cup seal disposed in said groove, and said bowl having a curved surface surrounding said tubular projection and contacting said cup seal at a location spaced below the upper rim of said bowl, said cup seal presenting a variable force between said tubular projection and said bowl in accordance with the pressure differential across said seal.

* * * * *